United States Patent
Hayduk

(10) Patent No.: US 7,596,384 B2
(45) Date of Patent: Sep. 29, 2009

(54) AUDIO OVER SUBSYSTEM INTERFACE

(75) Inventor: Matthew A. Hayduk, Calgary (CA)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 10/314,697

(22) Filed: Dec. 9, 2002

(65) Prior Publication Data

US 2004/0204080 A1 Oct. 14, 2004

(51) Int. Cl.
*H04M 1/00* (2006.01)

(52) U.S. Cl. ............ 455/550.1; 455/575.1; 379/428.01; 379/433.01

(58) Field of Classification Search ............... 455/73, 455/74, 550.1, 557–559, 575.1; 379/428.01, 379/433.01; 704/201
See application file for complete search history.

(56) References Cited

U.S. PATENT DOCUMENTS

| | | | |
|---|---|---|---|
| 6,266,715 B1 * | 7/2001 | Loyer et al. | 710/22 |
| 6,950,910 B2 * | 9/2005 | Rader | 711/148 |
| 7,069,428 B2 * | 6/2006 | Miyamoto et al. | 713/1 |
| 2002/0055979 A1 | 5/2002 | Koch et al. | |
| 2002/0152303 A1 * | 10/2002 | Dispensa | 709/224 |
| 2004/0068400 A1 * | 4/2004 | Gupta | 704/201 |

OTHER PUBLICATIONS

"The Intel Personal Internet Client Architecture" INTEL, Sep. 2001, XP002251759.*
PCT/US 03/36063, Aug. 5, 2004, PCT Search Report.
"The Intel Personal Internet Client Architecture", INTEL, Sep. 2001, Whitepaper, XP-002251759. pp. 1-16.

* cited by examiner

*Primary Examiner*—Raymond S Dean
(74) *Attorney, Agent, or Firm*—Schwegman, Lundberg & Woessner, P.A.

(57) ABSTRACT

Briefly, in accordance with one embodiment of the invention, a transport mechanism provides a digital interface to transfer audio data between an application subsystem and a communication subsystem in a wireless terminal such as a cellular terminal. A request from a driver of an audio codec in the application subsystem may result in the creation of a logical connection between the audio codec and the communication subsystem. The communication subsystem may directly transfer the audio information to memory using a direct memory access operation while performing an audio operation such as a cellular audio operation on the audio information. A direct memory access operation may then be utilized to directly transfer the audio information from memory to a serialized channel.

28 Claims, 3 Drawing Sheets

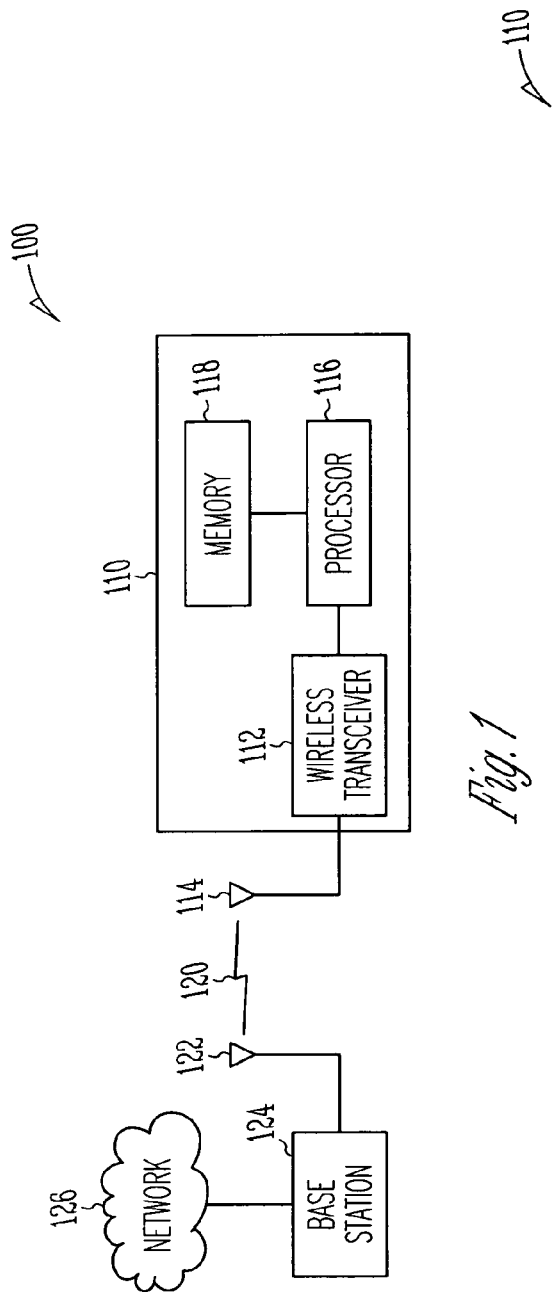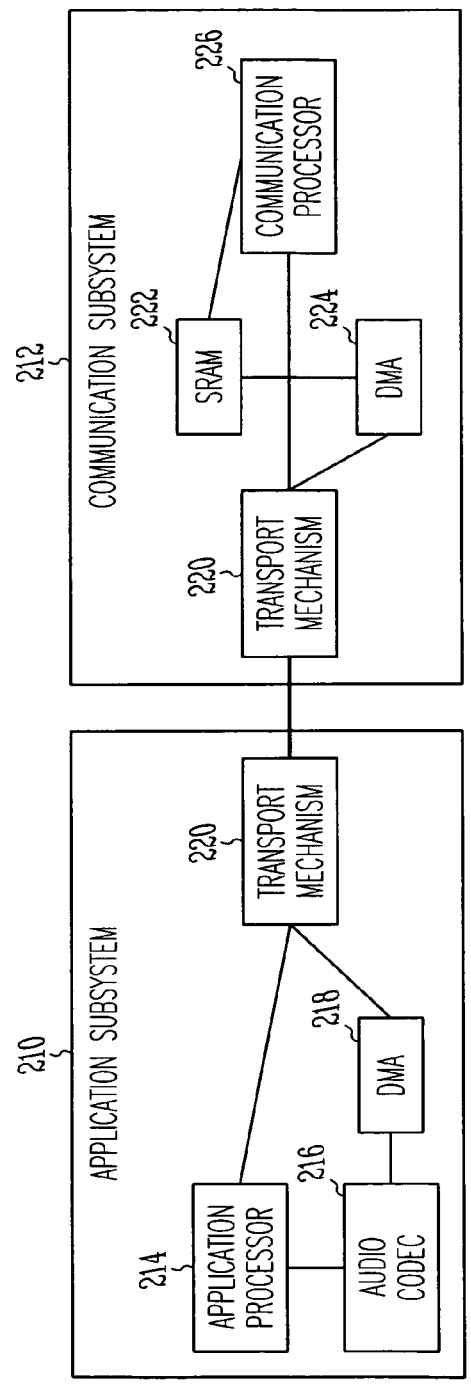

AUDIO OVER SUBSYSTEM INTERFACE

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a block diagram of a wireless communication system in accordance with one embodiment of the present invention;

FIG. 2 is a block diagram of a wireless terminal including an application subsystem and a communication subsystem having a transport mechanism interface between the application subsystem and the communication subsystem in accordance with one embodiment of the present invention;

Figure 3:
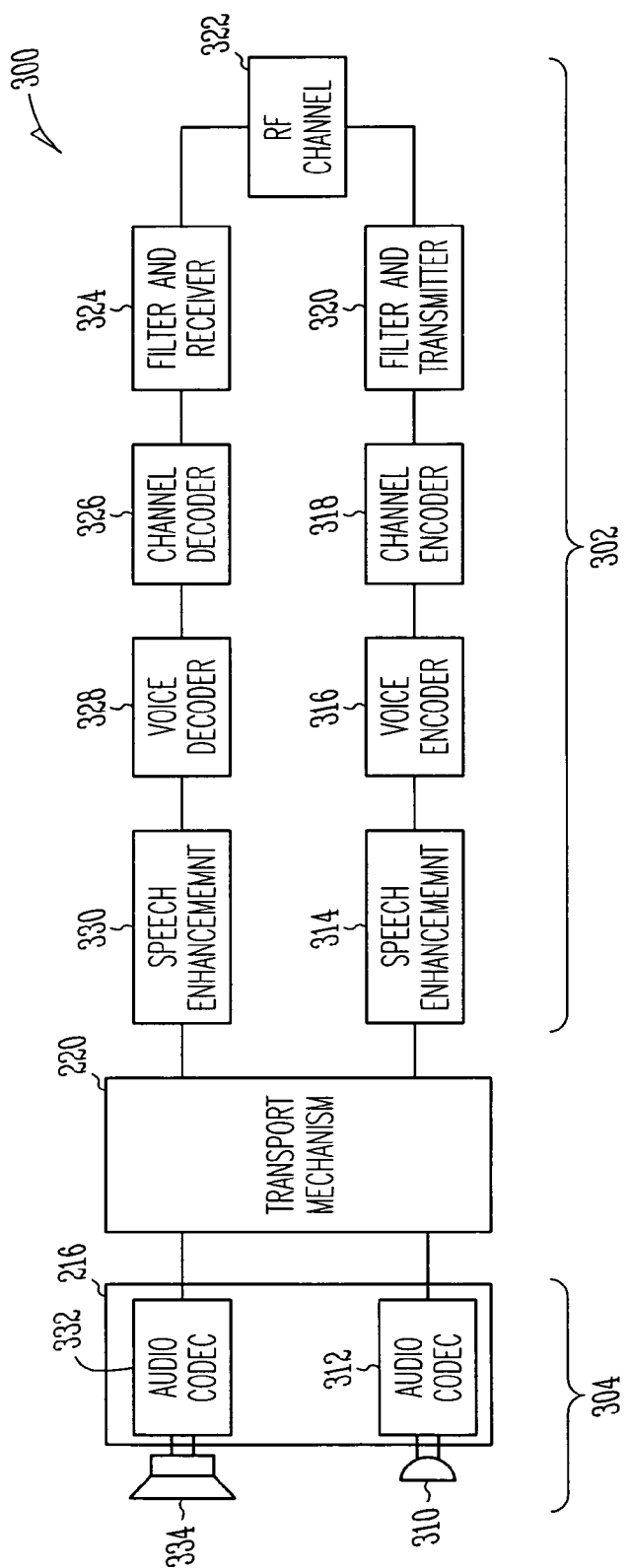
FIG. 3 is a block diagram of an typical cellular audio system of a wireless terminal in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

Referring now to FIG. 1, a communication system in accordance with one embodiment of the present invention will be discussed. In the communication system 100 shown in FIG. 1, a wireless terminal 110 may include a wireless transceiver 112 to couple to an antenna 114 and to a processor 116. Processor 116 in one embodiment may comprise a single processor, or alternatively may comprise a baseband processor and an application processor, although the scope of the invention is not limited in this respect. Processor 116 may couple to a memory 118 which may include volatile memory such as DRAM, non-volatile memory such as flash memory, or alternatively may include other types of storage such as a hard disk drive, although the scope of the invention is not limited in this respect. Some portion or all of memory may be included on the same integrated circuit as processor 116, or alternatively some portion or all of memory 118 may be disposed on an integrated circuit or other medium, for example a hard disk drive, that is external to the integrated circuit of processor 116, although the scope of the invention is not limited in this respect.

Wireless terminal 110 may communicate with base station 124 via wireless link 120, where base station 124 may include antenna 122. Base station 124 may couple with a network 126 so that wireless terminal 110 may communicate with network 126 including devices coupled to network 126 by communicating with base station 124 via wireless link 120. Network 126 may include a public network such as a telephone network or the Internet, or alternatively network 126 may include a private network such as an intranet, or a combination of a public and a private network, although the scope of the invention is not limited in this respect. Communications between wireless terminal 110 and base station 124 may be implemented via a wireless local area network (WLAN), for example a network compliant with a an Institute of Electrical and Electronics Engineers (IEEE) standard such as IEEE 802.11a, IEEE 802.11b, and so on, although the scope of the invention is not limited in this respect. In another embodiment, communications between wireless terminal 110 and base station 124 may be implemented via a cellular communication network compliant with a 3GPP standard, although the scope of the invention is not limited in this respect. In one particular embodiment of the invention, wireless communication system 100 includes a cellular audio path in a cellular telephone system, for example where wireless terminal 110 provides cellular telephone functions compliant with a 2.5G or 3G cellular telephone standard, although the scope of the invention is not limited in this respect.

Referring now to FIG. 2, a block diagram of a wireless terminal including an application subsystem and a communication subsystem having a transport mechanism interface 220, or transporter, between the application subsystem and the communication subsystem in accordance with one embodiment of the present invention will be discussed. As shown in FIG. 2, functions of wireless terminal 110 may be divided between an application subsystem 210 and a communication subsystem 212. Application subsystem 210 may include one or more applications to run on wireless terminal 110. Communication subsystem 212 may manage access of application subsystem 210 to network 126 via wireless link 120 to base station 124. Once a session is established between communication subsystem 212 and base station 124, application subsystem 210 may gain access to functions provided by network 126 through base station 124 over wireless link 120, although the scope of the invention is not limited in this respect. In one embodiment of the invention, communication subsystem 212 may present wireless communication services to application subsystem 210 through identified interfaces that abstract the services across one or more wireless protocols. Communication subsystem 212 may present such services independent of any platform or wireless technology used to deliver the services, although the scope of the invention is not limited in this respect.

An application processor 214 may couple to an audio codec 216, which in turn may couple to direct memory access (DMA) block 218 of application subsystem 210. Application processor 214 may directly couple to transport mechanism 220 to provide a control path, and may couple to transport mechanism 220 via audio codec 216 and DMA 218 to provide a data stream path, although the scope of the invention is not limited in this respect. Within communication subsystem 212, communication processor 226, which in one embodiment may be a cellular processor such as a baseband processor to couple to a cellular transceiver, may couple directly to transport mechanism 220 to provide a control path, and communication processor 226 may couple to transport mechanism 220 via static random access memory (SRAM) 222 and DMA 224 of communication subsystem 212 to provide a data stream path, although the scope of the invention is not limited in this respect. As shown in FIG. 2, transport mechanism 220 may be considered as two sub-blocks, one residing on application system 210 and one residing on communication subsystem 212 since transport mechanism 220 may comprise in part a software stack in application subsystem 210 and a physical hardware link in communication subsystem 212, although the scope of the invention is not limited in this respect.

In one embodiment of the invention, transport mechanism 220 may provide an interface between application subsystem 210 and communication subsystem 212. Audio data such as voice samples may be transferred between application subsystem 210 and communication subsystem 212 using transport mechanism 220 as a subsystem interface. Such a subsystem interface may be implemented where minimal path latency may be introduced using DMA, and using an Intel® Mobile Scalable Link (MSL) or a Universal Serial Bus (USB) standard as a higher-speed transport mechanism to achieve the transfer of audio data across the two subsystems. Once the DMA transfer is established through transport mechanism 220 via application processor 214 and communication processor 226, the audio data may transfer through the system without direct processor system software overhead for processor 116, thereby providing minimal delays into the path to meet any specified latency requirements.

In one embodiment of the invention, Intel® MSL may be utilized to manage transport mechanism 220 and DMA 218 and DMA 224 to support audio requirements between application subsystem 210 and communication subsystem 212, and to meet latency requirements over a single subsystem interface implemented by transport mechanism 220. The subsystem interface implemented by transport mechanism 220 may also support other control and data requirements for application subsystem 210, as well as providing a single coupling between application subsystem 210 and communication subsystem 212. The subsystem interface implemented by transport mechanism 220, such as provided by Intel® MSL, may support multiple real-time voice streams over the single subsystem interface.

Referring now to FIG. 3, a block diagram of an audio system of a wireless terminal in accordance with one embodiment of the present invention will be discussed. The block diagram of FIG. 3 illustrates an overview of the timing budget in a speech path for a mobile station on a cellular network embodied as wireless terminal 110. Conceptually, for example with cellular telephone systems, audio subsystem 300 may be broken into two parts, a cellular speech path 302 and an audio path 304, although the scope of the invention is not limited in this respect. Cellular speech path 302 may be particular to one or cellular technologies, however common path elements are shown in FIG. 3.

As shown in FIG. 3, cellular speech path 302 may include, for example, filtering and transmit and receive functions represented by filter and transmitter block 320 and by filter and receiver block 324, technology dependent channel encoding and decoding schemes represented by channel encoder block 318 and channel decoder block 326, technology voice codec represented by voice encoder block 316 and voice decoder block 328, for example adaptive multi-rate (AMR) speech encoding in GSM, and speech enhancements represented by speech enhancement blocks 314 and 330, for example echo cancellation and noise suppression, although the scope of the invention is not limited in this respect. Filter and transmitter block 320 and filter and receiver block 324 may be coupled via RF channel 322. Filter and transmitter block 320 and filter and receiver block 324 may apply spreading control and baseband filtering for baseband signaling, for example I and Q impulse. Channel encoder 318 and channel decoder 326 may apply channel coding and decoding operations for cellular air link technology which may include bit interleaving, symbol repetition, and convolutional encoding, although the scope of the invention is not limited in this respect. Voice encoder 316 and voice decoder 328 may implement cellular technology specific operations for voice encoding and decoding such as AMR in GSM. Speech enhancement blocks 314 and 330 may implement utilities that operate on speech samples such as echo cancellation, equalization, and noise suppression, although the scope of the invention is not limited in this respect. Each of the component blocks may consume a finite amount of processing time within communication processor 226 and the overall audio path, thereby introducing an effective audio path latency. Path latency may be increased by delay introduced by transport mechanism 220. Since there may be strict requirements for meeting overall system timing requirements, the invention may reduce such path latency to ensure meeting any timing requirement, although the scope of the invention is not limited in this respect.

Audio path 304 may include audio codecs 312 and 332 to receive audio input from microphone 310 and to provide audio output to speaker 334. In one embodiment, audio codecs 312 and 332 may be embodied in a single codec such as audio codec 216 of FIG. 2, although the scope of the invention is not limited in this respect. In one particular embodiment, audio codecs 312 and 332 may be pulse code modulation (PCM) audio codecs. Transport mechanism 220 may function as a bridge between cellular speech processing 302 and the audio codecs 312 and 332 of audio path 304, although the scope of the invention is not limited in this respect. As a result, transport mechanism 220 may link cellular speech path 302 to application audio path 304 through DMA transfer across application subsystem 210 and communication subsystem 212 to effectively reduce or eliminate data transfer buffering latencies otherwise involved in normal operating system procedures to accomplish a similar transfer.

Figure 4:
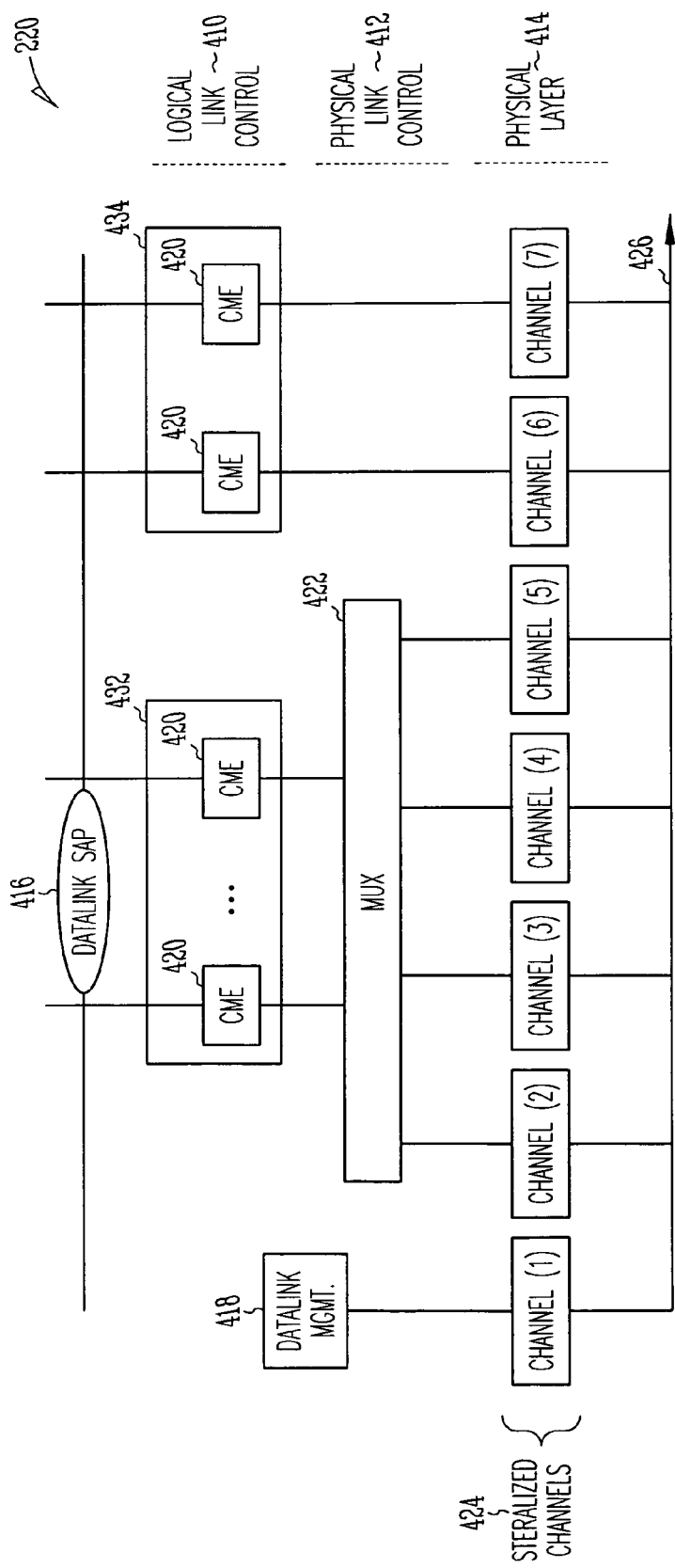
FIG. 4 is a block diagram of a transport mechanism interface between an application subsystem and a communication subsystem of a wireless terminal in accordance with an embodiment of the present invention.

Referring now to FIG. 4, a block diagram of a transport mechanism interface between an application subsystem and a communication subsystem of a wireless terminal in accordance with an embodiment of the present invention will be discussed. Transport mechanism may be subdivided into logic link control 410, physical link control 412, and the physical layer 414. Datalink service access protocol (SAP) 416 may couple higher layer software application including audio clients to one or more connection management endpoints (CME) 416 in the logical link control section 410 of transport mechanism 220. A datalink management block 418 may couple to at least one or more serialized channels 424, which may be channel 1 as shown, and may be used to establish and control logical connections established across transport mechanism 220. In physical link control section 412, one or more connection management endpoints 420 may be categorized as datalink service classes and be combined via multiplexer 422 to one or more serialized channels 424, which may be channels 2, 3, 4, and 5 as shown. Transport mechanism 220 may be embodied as Intel® MSL or USB, may provide a subsystem interface between application subsystem 210 and communication subsystem 212 and support control data as well as multiple speech paths while introducing minimal latency. Latency may also depend on the operating system, where the delay may be maintained within an acceptable timing constraint by establishing one or more conversational class connection management endpoints (CME) 420, which are show as coupled to channels 6 and 7, and connecting serialized channels 424 to DMA via connection 426, although the scope of the invention is not limited in this respect.

In one embodiment of the invention, CMEs 430 may be classified by the quality of service they are able to provide. Conversation class 434 may provide a transparent data stream to support two way real-time conversational audio or video data by introducing no software delays in the system after being initiated, and may communicate via serialized channel 6 and channel 7. Other datalink service classes 432 may support other data transfer quality of service rates in the event where real-time requirements may not be as constrained such as for streaming or for control or background data transfers. Such datalink classes 432 may be multiplexed together over available serialized channels 424, for example channel 1 through channel 5, although the scope of the invention is not limited in this respect.

As an example implementation, when a call is established, a conversational CME 420 may be requested from a driver of audio codec 216 of application subsystem 210 through data link management block 418. This will request a conversational CME 420 from the other end of the link and create a logical connection across application subsystem 210 and communication subsystem 212 to establish and transport speech data there between. Such an arrangement may bind one of the serialized channels 424, such as serialized channel 6 or 7 as shown, to a DMA chain as shown in FIG. 2. On the side of application subsystem 210, audio codec 216 may be directly controlled by application processor 214 and may receive data directly from the driver via the DMA descriptor. Similarly on the side of communication subsystem 212, communication processor 226 may perform the operations of cellular speech path 302, leaving the data samples in SRAM 222 of FIG. 2. The DMA descriptor may be again connected to one of the serialized channels 424 and connected to SRAM 222 for direct transfer. Effectively, this may establish a transport mechanism that ties audio codec 216 to the speech samples in SRAM 222 on another subsystem and memory space through this DMA and logical channel path. The delays involved in the transfer may be estimated in one embodiment to range from 0.5 to less than 1 millisecond for transfer latency. In such an embodiment, a transport mechanism 220 such as Intel® MSL or USB may be utilized to establish audio paths over a general-purpose subsystem interface without adversely impacting the path-timing budget, although the scope of the invention is not limited in this respect.

Although the invention has been described with a certain degree of particularity, it should be recognized that elements thereof may be altered by persons skilled in the art without departing from the spirit and scope of the invention. It is believed that the audio over subsystem interface of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
    receiving a request from an audio codec to establish a connection between an application subsystem and a communication subsystem of a wireless terminal; and
    creating the connection between the audio codec of the application subsystem and the communication subsystem in response to said request, the connection formed over a single subsystem interface coupling an application processor in the application subsystem to a communication processor in the communication subsystem through a transport mechanism and operable to provide a control path coupling the application processor and the communication processor, the connection further operable to transport audio information between the application subsystem and the communication subsystem over the single subsystem interface to provide a data stream path;
    wherein creating the connection includes binding one of a plurality of channels to a direct memory access chain to transport audio information by direct memory access between the application subsystem and the communication subsystem via the direct memory access chain, the direct memory access chain including a first direct memory access block in the application subsystem and a second direct memory access block in the communication subsystem.

2. A method as claimed in claim 1, further comprising performing a cellular audio operation on the audio information when the audio information is transported from the application subsystem to the communication subsystem.

3. A method as claimed in claim 1, further comprising storing audio information while performing a cellular audio operation on the audio information.

4. A method as claimed in claim 1, further comprising storing audio information while performing a cellular audio operation on the audio information, and then connecting a direct memory access channel to a serialized channel for transferring information from storage to the serialized channel.

5. A method as claimed in claim 1, wherein said creating includes creating a logical connection.

6. A method as claimed in claim 1, wherein said binding includes binding a serialized channel.

7. An article comprising a storage medium having stored thereon instructions that, when executed by a computing platform, result in the transport of audio information between an application subsystem and a communication subsystem by:
    receiving a request from an audio codec to establish a connection between the application subsystem and the communication subsystem of a wireless terminal; and
    creating the connection between the audio codec of the application subsystem and the communication subsystem in response to said request, the connection formed over a single subsystem interface coupling an application processor in the application subsystem to a communication processor in the communication subsystem through a transport mechanism and operable to provide a control path coupling the application processor and the communication processor, the connection further operable to transport audio information between the application subsystem and the communication subsystem over the single subsystem interface to provide a data stream path;
    wherein creating the connection includes binding one of a plurality of channels to a direct memory access chain to transport audio information by direct memory access between the audio codec and a memory in the communication subsystem via the direct memory access chain, the direct memory access chain including a first direct memory access block in the application subsystem and a second direct memory access block in the communication subsystem.

8. An article as claimed in claim 7, wherein the instructions, when executed, further result in performing a cellular audio operation on the audio information when the audio information is transported from the application subsystem to the communication subsystem.

9. An article as claimed in claim 7, wherein the instructions, when executed, further result in storing audio information while performing a cellular audio operation on the audio information.

10. An article as claimed in claim 7, wherein the instructions, when executed, further result in storing audio information while performing a cellular audio operation on the audio information, and then connecting a direct memory access channel to a serialized channel for transferring information from storage to the serialized channel.

11. An article as claimed in claim 7, wherein the instructions, when executed, further result in creating a logical connection.

12. An article as claimed in claim 7, wherein the instructions, when executed, further result in binding a serialized channel.

13. An apparatus, comprising:
    an application subsystem including an application processor directly coupled to a transport mechanism to provide a portion of a control path, and coupled to the transport mechanism through an audio codec and a first direct memory access block to provide a portion of a data stream path;
    a communication subsystem including a communication processor directly coupled to the transport mechanism to form another portion of the control path, and coupled to the transport mechanism through a static random access memory and a second direct memory access block to form another portion of the data stream path; and
    the transport mechanism including a single subsystem interface providing both the control path and the data stream path coupling the application subsystem and the communication subsystem through the transport mechanism, the data stream path coupled to the single subsystem interface via the first direct memory access block and the second direct memory access block to form a direct memory access chain, and operable to support direct memory access transfers of audio data streams between the application subsystem and the communication subsystem.

14. An apparatus as claimed in claim 13, wherein said transport mechanism has a bandwidth sufficient to provide isochronous transfer of audio information between said application subsystem and said communication subsystem.

15. An apparatus as claimed in claim 13, wherein said transport mechanism has a bandwidth sufficient to provide real-time transfer of audio information between said application subsystem and said communication subsystem.

16. An apparatus as claimed in claim 13, wherein said transport mechanism is adapted to transfer multiple streams of audio information between said application subsystem and said communication subsystem simultaneously.

17. An apparatus as claimed in claim 13, wherein said transport mechanism is adapted to maintain code synchronization between a codec of said application subsystem and a vocoder of said communication subsystem.

18. An apparatus as claimed in claim 13, further comprising a cellular transceiver to couple with said communication subsystem.

19. An apparatus, comprising:
a wireless terminal including a communication subsystem coupled to an application subsystem;
the application subsystem including at least one audio codec coupled to a transport mechanism through a first direct memory access block, the application subsystem including an application processor coupled directly to the transport mechanism;
the communication subsystem coupled to the transport mechanism, the communication subsystem including a second direct memory access block coupled to the transport mechanism and a communication processor, the communication processor coupled directly to the transport mechanism; and
the transport mechanism including a single subsystem interface providing both the control path and the data stream path coupling the application subsystem and the communication subsystem through the transport mechanism, the data stream path coupled to the single subsystem interface via the first direct memory access block and the second direct memory access block to form a direct memory access chain, and operable to support direct memory access transfers of audio data streams between the application subsystem and the communication subsystem.

20. An apparatus as claimed in claim 19, wherein said transport mechanism has a bandwidth sufficient to provide isochronous transfer of audio information between said communication processor and the application processor.

21. An apparatus as claimed in claim 19, wherein said transport mechanism has a bandwidth sufficient to provide real-time transfer of audio information between said communication processor and the application processor.

22. An apparatus as claimed in claim 19, wherein said transport mechanism is adapted to transfer simultaneously multiple streams of audio information between said communication processor and the application processor.

23. An apparatus as claimed in claim 19, wherein said transport mechanism is adapted to maintain code synchronization between a codec and a vocoder.

24. An apparatus as claimed in claim 19, further comprising a cellular transceiver to couple with said communication processor.

25. The article of claim 13, wherein the transport mechanism is configured to transfer communication services independent of the audio information.

26. The article of claim 13, wherein the article is included in a wireless terminal to communicate via a wireless local area network (WLAN), and wherein the WLAN is compliant with an Institute of Electrical and Electronics Engineers (IEEE) standard.

27. The apparatus of claim 19, wherein the apparatus is included in a wireless terminal to communicate via a wireless local area network (WLAN), and wherein the WLAN is compliant with an Institute of Electrical and Electronics Engineers (IEEE) standard.

28. The apparatus of claim 19, wherein the transport mechanism includes speech enhancement.

* * * * *

UNITED STATES PATENT AND TRADEMARK OFFICE
CERTIFICATE OF CORRECTION

PATENT NO. : 7,596,384 B2
APPLICATION NO. : 10/314697
DATED : September 29, 2009
INVENTOR(S) : Matthew A. Hayduk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Twenty-eighth Day of September, 2010

David J. Kappos
*Director of the United States Patent and Trademark Office*